E. L. MILLS.
STUFFING BOX.
APPLICATION FILED OCT. 26, 1908.
916,573.
Patented Mar. 30, 1909.
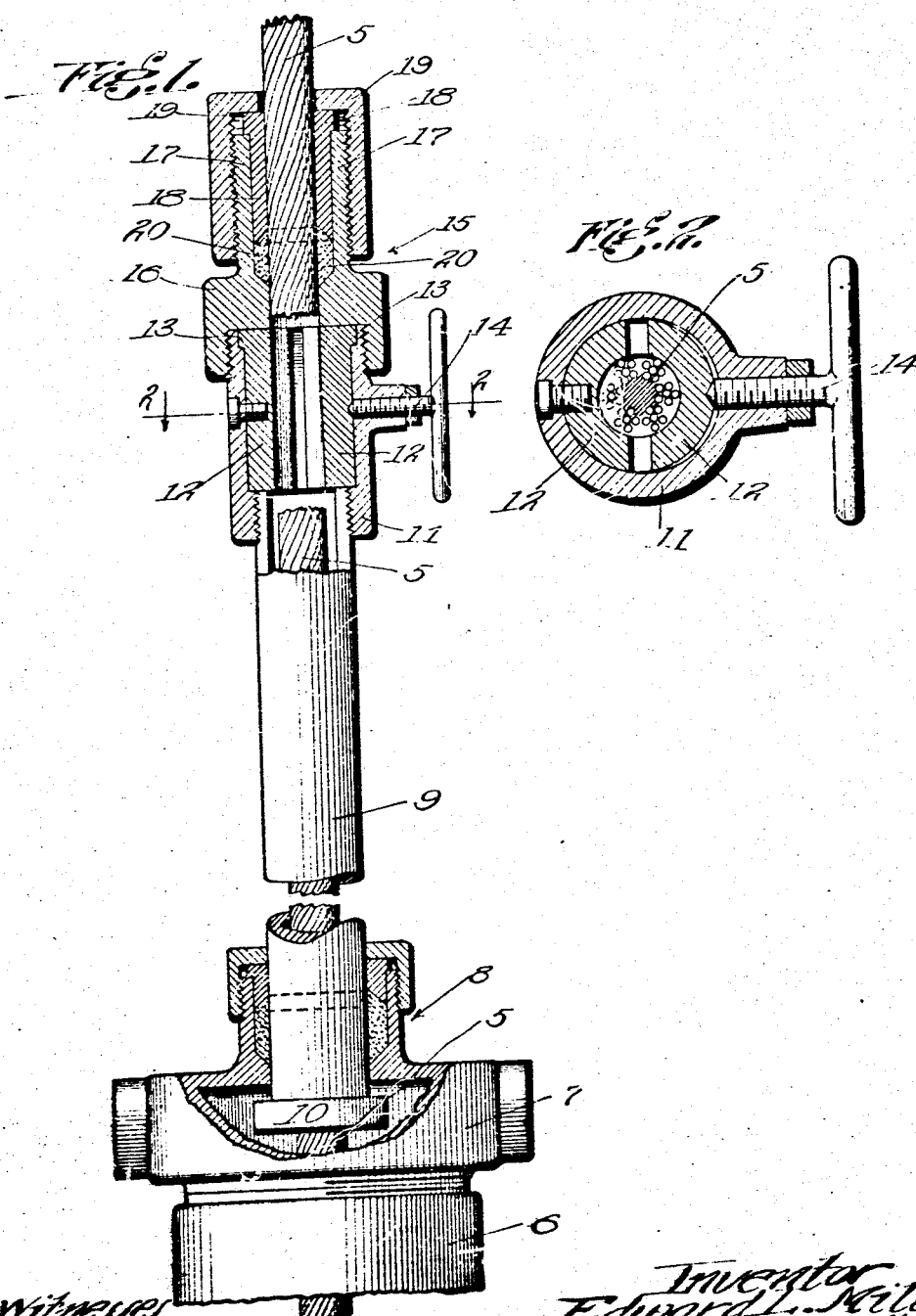
Witnesses
Inventor
Edward L. Mills
James T. Berkelew
Attorney.

UNITED STATES PATENT OFFICE.

EDWARD L. MILLS, OF LOS ANGELES, CALIFORNIA.

STUFFING-BOX.

No. 916,573.            Specification of Letters Patent.            Patented March 30, 1909.

Application filed October 26, 1908. Serial No. 459,516.

*To all whom it may concern:*

Be it known that I, EDWARD L. MILLS, a citizen of the United States, residing at Los Angeles, in the county of Los Angeles and State of California, have invented new and useful Improvements in Stuffing-Boxes, of which the following is a specification.

This invention consists in a device adapted to prevent the flow of fluid from a well while drilling operations are being carried on. It is often the case that drilling must be done when fluid under pressure is seeking exit at the top of the well and unless some provision is made for stopping this flow, the fluid, such as valuable oil, is lost, besides creating great inconvenience.

The main object of construction in the present invention has been to obviate all wear on the drilling line, while at the same time to provide a perfectly tight joint and prevent all fluid flow. With this in view a sleeve is secured around the line, the sleeve moving with the line. A sliding connection is made between the sleeve and the well casing, this connection being fluid tight. The line is thus allowed to move freely without any wear and without the escape of fluid from the hole.

In the accompanying drawings forming a part of this specification:—Figure 1 is a longitudinal section of my device. Fig. 2 is an enlarged cross section taken on line 2—2 of Fig. 1.

In the drawings 5 designates the drilling line and 6 the upper part of the well casing, my invention being applicable to any size and character of line and casing. Mounted on the casing is a cap 7 having at its center and upper part an ordinary stuffing box 8, the particular construction of the stuffing box not entering into the present invention.

A sleeve 9 of some length is adapted to work vertically in the stuffing box, a collar 10 being provided to prevent the sleeve from disengagement with the box. This sleeve is screwed into a sleeve 11 at its upper end, the clamp sleeve being hollow and carrying two clamp segments 12 within it. A shouldered portion 13 at the top of the segments prevents their accidental disengagement and loss. The line passes between the segments and a hand screw 14 is used to tighten the clamps on the line, the whole movable part of the stuffing box being thus secured to the line and forced to reciprocate vertically with it. The line passes loosely through the sleeve and any fluid might pass around the line and out through the clamps if it were not for the provision of stuffing box 15 on the upper end of the clamp sleeve. This stuffing box is comprised in a body member 16 having an upwardly extending screw threaded sleeve 17 into which a compression sleeve 18 is forced by a nut 19 surrounding sleeve 17 and in screw threaded engagement therewith. Packing 20 within the stuffing box is thus held in tight engagement with the line and any fluid flow thereby prevented.

In the use of my stuffing box the line is first passed through it as illustrated, the lower end of the line being connected to the drilling tools. The tools are then lowered into the well and the operations of drilling proceeded with, cap 7 having been screwed into the casing and stuffing box 15 tightened up. When the tools are withdrawn stuffing box 15 is loosened so that the line may pass through it easily and cap 7 is unscrewed from the casing. The whole device remains in position by its own weight until the tools come to the surface when it is lifted and carried by them up into the derrick.

The gist of this invention consists in the provision of separate means for securing to the line and for allowing the vertical movement thereof. The minor details, as to relative placement of the parts, may be varied to suit the needs of any particular case. For instance, the upper stuffing box may be placed below the clamps for some purposes.

I claim:—

1. A stuffing box adapted for use in combination with a stationary well pipe and a drilling line reciprocating therein, comprising a sleeve surrounding the line and projecting within the pipe, sliding connective means between the sleeve and the pipe, stop means to prevent the entire withdrawal of the sleeve from the pipe, a clamp on the sleeve for securing the line therein, and a stuffing box removably mounted on the sleeve and surrounding the line to prevent the passage of fluid between the line and sleeve.

2. A stuffing box, adapted for use in combination with a stationary well pipe and a drilling line reciprocating therein, comprising a sleeve surrounding the line and proseating within the pipe, sliding connective means between the sleeve and the pipe, a clamp on the sleeve for securing the line therein, and a stuffing box removably mounted on the sleeve independently of the clamp and surrounding the line to prevent the passage of fluid between the line and the sleeve.

In witness that I claim the foregoing I have hereunto subscribed my name this 20th day of October 1908.

EDWARD L. MILLS.

Witnesses:
JAMES T. BARKELEW,
EVA WHITCOMB.